United States Patent
Tei et al.

(10) Patent No.: US 6,794,488 B2
(45) Date of Patent: Sep. 21, 2004

(54) METHOD FOR PURIFYING A THERMOPLASTIC NORBORNENE RESIN, A SUBSTRATE USING SUCH A RESIN, AND A MAGNETIC RECORDING MEDIUM USING SUCH A SUBSTRATE

(75) Inventors: Youich Tei, Nagano (JP); Syoji Sakaguchi, Nagano (JP); Katsunori Suzuki, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 161 days.

(21) Appl. No.: 09/828,705

(22) Filed: Apr. 6, 2001

(65) Prior Publication Data

US 2001/0056051 A1 Dec. 27, 2001

(30) Foreign Application Priority Data

Apr. 12, 2000 (JP) ........................................ 2000-111325

(51) Int. Cl.[7] .................................................. C08F 6/00
(52) U.S. Cl. ...................... 528/495; 369/47; 369/59.11; 369/59.24; 428/64; 526/169; 526/171; 526/281
(58) Field of Search ................................. 526/169, 171, 526/281; 428/64; 528/495; 369/47, 59.11, 59.24

(56) References Cited

U.S. PATENT DOCUMENTS 6,350,832 B1 * 2/2002 Bell et al. ................... 526/161

FOREIGN PATENT DOCUMENTS

| JP | 49-130500 | 12/1974 |
| JP | 51-148771 | 12/1976 |
| JP | 05-093079 | 4/1993 |

\* cited by examiner

Primary Examiner—Terressa M. Boykin
(74) Attorney, Agent, or Firm—Darby & Darby

(57) ABSTRACT

A thermoplastic norbornene resin is purified by using a cleaning liquid to eliminate organic impurities, ionic impurities, metallic impurities, and particles of the resin. The cleaning liquid is selected from 2-propanol and a mixed solvent of 2-propanol and water. A substrate for a magnetic recording medium of the invention is fabricated by injection-molding the thermoplastic norbornene resin purified by this method. A magnetic recording medium of the invention includes such a substrate, and a magnetic layer, a protective layer, and a liquid lubricant layer sequentially formed on the substrate. A method for manufacturing such a magnetic recording medium is also provided.

8 Claims, 1 Drawing Sheet

METHOD FOR PURIFYING A THERMOPLASTIC NORBORNENE RESIN, A SUBSTRATE USING SUCH A RESIN, AND A MAGNETIC RECORDING MEDIUM USING SUCH A SUBSTRATE

BACKGROUND OF THE INVENTION

The present invention relates to a method for purifying a thermoplastic norbornene resin. The present invention further relates to a substrate of a magnetic recording medium using such a purified thermoplastic norbornene resin. The invention also relates to a magnetic recording medium using such a substrate, and a method for manufacturing such a magnetic recording medium. The magnetic recording medium is installed in an external recording device of a computer or the other magnetic digital data-recording device.

With increasing capacity of recording devices using magnetic recording medium, efforts have been made to decrease the flying height of the magnetic head in order to upgrade the recording density. The flying height of a magnetic head requires a magnetic recording medium with extremely smooth and high precision surface. For example, a conventional substrate made of non-magnetic metal, such as aluminum, needs high precision machining.

An example of a manufacturing method of a conventional substrate of a magnetic recording medium made of non-magnetic metal and a magnetic recording medium using such a substrate is described in the following.

A non-magnetic substrate is generally made of a blank material that is prepared by rolling a heated and molten metal, annealing, and cutting into specified dimensions. The blank material is subjected to inner-and outer-diameter treatment and lapping to improve surface precision. To improve surface hardness, Ni-P plating layer, having thickness of 13 $\mu$m, is then formed on the blank material. The surface of the Ni-P layer is polished to surface roughness Ra=10 Å, and the polished surface is finally lapped using diamond slurry. In a contact start and stop (CSS) zone of the thus obtained substrate, laser zone texture is formed having bump height of 190 Å and bump density of radial 30 $\mu$m×circumferential 30 $\mu$m. Finally, high precision cleaning is conducted on the substrate to obtain a substrate for a magnetic recording medium.

On the thus obtained substrate, a chromium under-layer 500 Å thick, a magnetic layer of Co-14Cr-4Ta 300 Å thick, and a carbon protective layer 80 Å thick are sequentially formed by DC sputtering method. The sputtered surface is tape varnished. Then, a fluorine-containing lubricant layer, 20 Å thick, is formed by dip-coating or spin-coating method, obtaining a magnetic recording medium.

A conventional method for manufacturing a substrate of a magnetic recording medium and a conventional method for manufacturing a magnetic recording medium are becoming more and more complicated, as the density requirements have increased in recent years. In addition, it is also demanded to provide a magnetic recording medium with less cost than usual while maintaining high functionality of the medium. To compromise these conflicting requirements, a new type of magnetic recording medium has been proposed that uses a substrate made of plastic material.

A method of manufacturing a plastic substrate for a magnetic recording medium by molding and forming a CSS zone simultaneously with the molding provides high productivity and thus industrially advantageous resulting in magnetic recording media with lower cost.

A plastic substrate for a magnetic recording medium is manufactured by injection-molding resin pellets, for example. The molding process easily generates protrusion or recess defects with a few micron size on the substrate surface, which is a different situation from a metal substrate and a ceramic substrate such as glass substrate. This is a serious problem in a substrate for a magnetic recording medium, in which high surface precision is essential.

Producing a magnetic recording medium by using a plastic substrate including such defects may cause failure of read and write by a head or head crash during seeking operation.

Further, a magnetic recording medium produced by using such a plastic substrate may cause blistering on the substrate surface when the substrate is repeatedly left in an environment of high temperature and high humidity and an environment of low temperature and low humidity. The blistering lowers environmental reliability.

Material for a plastic substrate of a magnetic recording medium may be selected from a polycarbonate resin and a poly(methyl methacrylate). A thermoplastic norbornene resin may also be used for a plastic substrate. The thermoplastic norbornene resin exhibits excellent characteristics including high heat resistance, low hygroscopicity, and geometry stability, thus, provides a favorable substrate for a magnetic recording medium. However, the thermoplastic norbornene resin also involves the above-described common problems of a plastic substrate.

OBJECTS AND SUMMARY OF THE INVENTION

It is an object of the present invention to provide a method for purifying a thermoplastic norbornene resin.

It is another object of the present invention to provide a plastic substrate of a magnetic recording medium having scarce surface defects and exhibiting excellent environmental reliability using a thermoplastic norbornene resin purified by such a purifying method.

It is still another object of the invention to provide a magnetic recording medium using such a plastic substrate.

It is further object of the present invention to provide a method for manufacturing such a magnetic recording medium.

The present invention provides a magnetic recording medium holding such a high precision surface that has scarce surface defect even after heat shock test at high temperature and high humidity or low temperature and low humidity as well as at normal temperature and normal humidity.

The inventors of the present invention made numerous studies to solve the above-described problems and found that the objects can be achieved by injection-molding using pellets of thermoplastic norbornene resin that is purified to less than a certain value of impurity concentration. The present invention has been accomplished based on the finding.

The first aspect of the present invention involves a purifying method of a thermoplastic norbornene resin, in which organic impurities, ionic impurities, metallic impurities, and particles are eliminated by cleaning liquid. The cleaning liquid in the invention is 2-propanol (hereinafter also referred to as "IPA") or a mixed solvent of 2-propanol and water. The mixed solvent is a mixture of 2-propanol and water with mixing ratio 2-propanol:water of from 1:1 to 5:1 in volume. Impurity concentration in a resin purified by a purification method according to the invention is favorably as follows: organic impurities, not more than 30 ppb; ionic impurities, not more than 5 ppb; metallic impurities, not more than 5 ppb. The above-mentioned organic impurities may include hydrocarbon impurities, deteriorated antioxidant, and oxidized and deteriorated resin component. Favorable concentration of these impurities are as follows: hydrocarbon impurities, not more than 20 ppb; deteriorated antioxidant, not more than 5 ppb; oxidized and deteriorated resin component, not more than 5 ppb.

The second aspect of the invention involves a plastic substrate for a magnetic recording medium. The plastic substrate is produced by injection-molding a thermoplastic norbornene resin that is purified by an above-described purifying method of the first aspect of the invention. Protrusion defects and recess defects on the substrate surface with the diameter of 1 μm or more are present preferably in a number of not more than 100 per surface.

The third aspect of the invention involves a magnetic recording medium comprising a plastic substrate of the second aspect of the invention; and a magnetic layer, a protective layer and a liquid lubricant layer sequentially formed on the plastic substrate. Advantageously, the magnetic recording medium does not generate any blister having a diameter of not less than 1 μm and a height of not less than 0.1 μm when the medium is left under an environmental condition of 60° C. and 80% RH, or −40° C. and 10% RH, or a condition combining these conditions.

The fourth aspect of the invention involves a method of manufacturing a magnetic recording medium comprising steps of purifying a thermoplastic norbornene resin, and forming a plastic substrate of a magnetic recording medium by injection-molding the purified thermoplastic norbornene resin; and a step for depositing a magnetic layer, a protective layer, and a liquid lubricant layer sequentially formed on the plastic substrate, wherein the step for purifying the resin comprises a process for cleaning the thermoplastic norbornene resin in a cleaning liquid selected from 2-propanol and a mixed solvent composed of 2-propanol and pure water.

Advantageously, the mixed solvent has a mixing ratio of 2-propanol to pure water of from 1:1 to 5:1 in volume.

The above, and other objects, features and advantages of the present invention will become apparent from the following description read in conjunction with the accompanying drawing, in which like reference numerals designate the same elements.

DETAILED DESCRIPTION OF THE INVENTION

Figure 1:
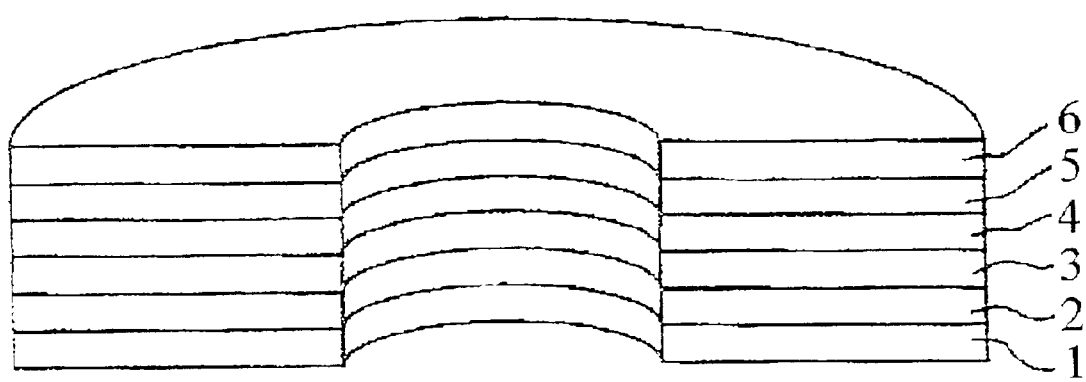
FIG. 1 is a schematic cross sectional view showing a magnetic recording medium according to an embodiment of the present invention.

A first aspect of the present invention involves a purifying method of a thermoplastic norbornene resin by means of cleaning the resin under a certain condition in order to eliminate impurities in the resin.

The resin used in the present invention is not a polycarbonate resin or a poly(methyl methacrylate) resin that is commonly used in a substrate of a magneto-optical recording medium. The resin used in the invention is a thermoplastic norbornene resin, which exhibits high heat resistance, low hygroscopicity, a rigid structure, and geometry stability. The thermoplastic norbornene resin may be a polyolefin norbornene resin, specific examples of which include ZEONEX280R and ZEONEX480, manufactured by Nippon Zeon Co., Ltd., APEL6150 and APEL6124, manufactured by Mitsui Chemical Co., Ltd., and ARTON manufactured by JSR Corporation.

In the present invention, a thermoplastic norbornene resin is used as a raw material of a substrate of a magnetic recording medium. However, a thermoplastic norbornene resin as supplied from a manufacturer, different from a metal substrate or a ceramic substrate such as a glass substrate, raises a problem that an injection-molded substrate includes protruding or recessed defects with a diameter of several μm.

The generation of these defects is considered to depend on purity and molecular weight distribution of a resin pellet used in the injection-molding. A thermoplastic norbornene resin contains organic impurities, ionic impurities, metallic impurities, and particles. The organic impurities include, for example, alcohol or carboxylic acid that is a deterioration product generated by oxidation of raw material for synthesis of the pellet, and a deterioration products of an antioxidant of a phenol derivative that is added for stability of the resin. The particles may be contained or attached from the environment in the process of synthesis or transportation of the pellet. The quantity of these impurities substantially affects the generation of the defects in the substrate.

Because a thermoplastic norbornene resin contains these impurities, defects are liable to be generated in a substrate made of the resin, as discussed below.

A thermoplastic norbornene resin is a non-polar resin in view of the molecular structure thereof. On the other hand, the impurities contained in the resin, including an oxidized deterioration product of raw material of the resin, a deterioration product of an antioxidant of a phenol derivative, and an ionic impurity, are relatively highly polar components. The impurities, having high polarity, migrate by diffusion towards surface portion of the bulk of the resin, tending to separate from the resin component. Thus, the impurities tend to be concentrated on the substrate surface after injection-molding of a thermoplastic norbornene resin. Therefore, a substrate made of a thermoplastic norbornene resin is liable to generate the aforementioned surface defects.

In addition, the deterioration product of an oxide of a raw material component of the resin and the deterioration product of an antioxidant of a phenol derivative have lower molecular weights than before deterioration and contain a polar group containing oxygen, for example, a hydroxyl group in an alcohol or a carboxyl group in a carboxylic acid. Thus, the melt viscosity of the deterioration product differs from the melt viscosity of the resin itself. As a result, a resin containing such impurities is liable to generate defects caused by fluidity difference between the deterioration product and the resin component in the process of injection-molding inside of the mold starting form the deterioration product as a core point.

A magnetic recording medium having a plastic substrate containing such impurities as described above causes blistering in the substrate when the medium is repeatedly left under either hot and humid environments or cold and dry conditions. The blistering lowers environmental reliability.

As described above, a thermoplastic norbornene resin commonly contains various impurities which may cause problems.

Concentrations of various kinds of impurities in thermoplastic norbornene resins are determined. The impurity concentration of a polyolefin thermoplastic norbornene resin ZEONEX280R manufactured by Nippon Zeon Co., Ltd., as an example, is determined. The results are shown in Tables 1 through 3.

The concentrations of the ionic impurities given in Table 1 were determined by an analysis on an ion chromatography of the extraction liquid that was obtained by oscillation and extraction of 10 g of pellets of the resin in 100 ml of a solvent composed of IPA and ultrapure water having resistivity of 18.3 MΩ-cm with volume ratio of IPA:water=1:1 for 20 minutes.

The concentrations of the organic impurities given in Table 2 were determined by an analysis on a GC-MS, in which 10 g of pellets of the resin was heated at 120° C., the generated gas was adsorbed on activated carbon, then, the adsorbate was desorbed from the activated carbon by means of purge-and-trap method, and supplied to the GC-MS analysis.

The concentrations of the metallic impurities given in Table 3 were determined by an analysis on an ion chromatography of the extraction liquid that was obtained by oscillation and extraction of 10 g of pellets of the resin in 100 ml of a solvent composed of IPA and ultrapure water having resistivity of 18.3 MΩ-cm with volume ratio of IPA:water=1:1 for 20 minutes.

TABLE 1

| | Ionic impurities (ppb) | | | | | | |
|---|---|---|---|---|---|---|---|
| | Na | $SO_4$ | $NO_3$ | K | Cl | HCOO | $NH_4$ |
| Lot A | 150 | 40 | 20 | 15 | 10 | 15 | 2 |
| Lot B | 120 | 60 | 30 | 15 | 15 | 10 | 1 |
| Lot C | 85 | 50 | 35 | 20 | 10 | 10 | 2 |

TABLE 2

| | Organic impurities (ppb) | | | |
|---|---|---|---|---|
| | deterioration product of oxidized resin: alcohol, carboxylic acid | deterioration product of antioxidant | siloxane | unreacted resin raw material and solvent |
| Lot A | 20 | 10 | 38 | 10 |
| Lot B | 46 | 18 | 15 | 20 |
| Lot C | 60 | 20 | 13 | 40 |

TABLE 3

| | Metallic impurities (ppb) | | | | | |
|---|---|---|---|---|---|---|
| | Ca | K | Fe | Cr | Cu | Zn |
| Lot A | 100 | 40 | 60 | 10 | 3 | 5 |
| Lot B | 80 | 60 | 45 | 30 | 25 | 10 |
| Lot C | 50 | 25 | 10 | 15 | 10 | 10 |

The results given in Tables 1 through 3 revealed the following.
(1) In the ionic impurities, contents of ions of Na, $SO_4$, $NO_3$ and K are large. Ions of Cl, HCOO, and $NH_4$ are also contained.
(2) The organic impurities contained in a relatively large quantity are deterioration products of oxidized resin including alcohol and carboxylic acid produced by oxidation of resin component, deterioration products of antioxidant added for stabilizing the resin, and siloxanes that are organic silicon compounds containing oxygen. Unreacted raw substance for resin synthesis and residual solvent are also contained.
(3) In the metallic components, Ca, K, and Fe are contained in relatively large quantity.

In order to study the influence of these impurities in the thermoplastic norbornene resin on the surface of a substrate for a magnetic recording medium made of the resin, analysis was made on the defect portion of the substrate surface. The analysis revealed that the surface defects were classified into the following three categories.
(1) Defects of Category 1
A defect of this category is a projecting defect, containing impurity components that are deterioration product of antioxidant added into the resin, ions of Na, S, Si, and Ca, and metallic impurities.
(2) Defects of Category 2
A defect of this category is also a projecting defect, containing impurity components that are deterioration product of oxidized resin, such as alcohol and carboxylic acid compound.
(3) Defects of Category 3
A defect of this category is a concave defect that is formed by transformation of a ball shape contaminant attached on the mold surface. The ball shape contaminant is either lower carboxylic acid salt that is a deterioration product of the resin component generated by final stage oxidation, or ions of Na, K, or Si.

The number of these projecting and concave defects was from 100 to 500 per one surface of a substrate counting the defects not less than 1 μm in diameter. If a magnetic recording medium is manufactured using a substrate that has such defect-bearing surface condition, then errors in the medium occur at the region corresponding to the defects, and the medium would harm the head and even crash the head in the worst case, depending on the size of the defect.

As described above, it is clearly shown by the analysis that the components of the impurities contained in the thermoplastic norbornene resin are same as the components of the defect portion of the substrate for a magnetic recording medium manufactured by injection-molding the resin. This fact suggests that the impurities contained in the resin formed the defects on the surface of the substrate. Cores of the defects are formed by the impurities contained in the resin, specifically, deterioration products of the resin and the antioxidant that affects fluidity in the injection-molding process. The cores of the defects attaches on the surface of the substrate and the mirror surface of the mold, and results in the protruding or concave defects on the substrate surface.

Therefore, if the impurities in the thermoplastic norbornene resin are eliminated, the defects on the substrate for a magnetic recording medium made of the resin should decrease.

When a magnetic recording medium is manufactured by depositing magnetic recording layers and other layer on a substrate made of an unpurified thermoplastic norbornene resin and left under a hot and humid environment or a cold and dry environment, or repeatedly left under these environments, blistering occurs on the medium surface. The blistering is considered to occur caused by interaction between moisture absorbed in the substrate and hydrophilic impurities, namely, alcohol, carboxylic acid compound, ionic and metallic impurities, existing in the boundary region of the substrate and the magnetic layer. The interaction product emerges on the medium surface through diffusion to form a blister. Since the blistering may be attributed to impurities in the thermoplastic norbornene resin, the blistering is expected to decrease or disappear by removing the impurities in the resin.

Therefore, the impurities in the thermoplastic norbornene resin are favorably eliminated.

The impurities in the resin that are discussed in the description of the invention are specifically ionic impurities, organic impurities, and metallic impurities. The ionic impurities are ions, such as, Na, $SO_4$, $NO_3$, K, Cl, HCOO, and $NH_4$. The organic impurities includes deterioration products of oxidized resin, such as alcohol and carboxylic acid compound produced by oxidation and deterioration of the resin, deterioration products of antioxidant produced by deterioration of antioxidant such as aromatic compounds including phenol derivatives contained in the resin, siloxane that is an organic compound containing silicon and oxygen, unreacted residues from the raw material and the solvent for synthesis of the resin, and hydrocarbon impurities such as aliphatic hydrocarbons with carbon number of 6 to 14, including isomers, namely, from hexane $C_6H_{14}$ and hexene $C_6H_{12}$ to tetradecane $C_{14}H_{30}$ and tetradecene $C_{14}H_{28}$. The metallic impurities include Ca, K, Fe, Cr, Cu, and Zn.

A method for purifying the thermoplastic norbornene resin according to the invention will be described below, based on the analytical studies described above.

The analytical studies show that the impurities in the resin that causes surface defects are relatively hydrophilic in general, including organic impurities such as alcohol and carboxylic acid. Accordingly, cleaning using solution or solvent with high surface tension is effective for purifying the resin.

The inventors of the present invention have found a method for purifying a thermoplastic norbornene resin, wherein purification is performed by cleaning the resin using IPA or mixed solvent of IPA and water, and allowing the cleaning liquid to penetrate into inside of the resin, so that effective elimination of the impurities is accomplished.

Consequently, IPA or mixed solvent of IPA and water is used as cleaning liquid in the invention. In case the mixed solvent of IPA and water is employed, mixing ratio in volume of IPA to water is preferably from 1:1 to 5:1, more preferably 1:1 to 2:1, although not limited to the range. The water used is preferably pure water, specifically ultrapure water. IPA is preferably as pure as possible.

The thermosetting norbornene resin may be in any configuration as long as cleaning can be effectively performed, yet a form of a pellet is preferable.

A cleaning process in the present invention will be described below.

The cleaning of a thermoplastic norbornene resin according to the present invention is performed by dipping the resin in IPA or mixed solvent of IPA and water and oscillating the resin. "Oscillation" in the present invention means to make the cleaning liquid to penetrate into the resin by means of stirring or shaking for removal of impurities in the resin. Cleaning in the invention is performed by oscillating the resin in the cleaning liquid and further, immersing the resin in the cleaning liquid. In a specific example of the cleaning process, the resin and the cleaning liquid are put into a vessel such as a separating funnel, in the volume ratio of resin:liquid=1:2, and oscillated by an appropriate oscillating means such as a shaker.

The oscillating time is preferably not shorter than 2 hr. The immersion time is preferably not shorter than 2 hr. In case the cleaning liquid used is IPA alone or mixed solvent of IPA:water=1:1, the immersion time is preferably not shorter than 12 hr, and in case the cleaning liquid used is mixed solvent of IPA:water=2:1, the immersion time is preferably not shorter than 2 hr.

The cleansed thermoplastic norbornene resin is then rinsed using rinse liquid of the same composition as the cleaning liquid and also using water. Each of the rinsing operation using the rinse liquid and the rinsing operation using water is preferably conducted at least twice. As water for the rinse, ultrapure water with resistivity of 18 MΩ-cm or more may be used, for example. The resulting thermoplastic norbornene resin is then rinsed with running ultrapure water, for example, for five minutes or more, and dried.

Although rinsing operation may be conducted by means of any method known to the skilled person, the above-described oscillation in the cleaning process may be applied correspondingly to the rinse process. The resin is first oscillated in rinse liquid of the same composition as the cleaning liquid for 2 to 3 minutes. After the completion of oscillation, the rinse liquid is renewed and the rinse operation by oscillation is conducted again. Then, the resin is rinsed twice with ultrapure water, and finally, rinsed with running water for at least 5 minutes. Drying may be performed by any means as long as capable to completely remove cleaning liquid, rinse liquid, and water. For example, drying by heating, drying by heating in vacuum, or an appropriate combination of these means. Specifically, drying at 100° C. for 24 hr followed by drying in a vacuum at 100° C. for 8 hr can remove cleaning liquid, rinse liquid, and water.

The ionic impurities, organic impurities and metallic impurities of the resin in the present invention are to be removed to a quantity less than certain value. The content of each of ionic impurities, namely, Na, $SO_4$, $HO_3$, K, Cl, HCOO and $NH_4$ is preferably controlled to 5 ppb or less. The content of organic impurities is preferably controlled to 30 ppb or less, wherein the content of hydrocarbon impurities is 20 ppb or less, the content of deterioration product of antioxidant is 5 ppb or less, and the content of alcohol or carboxylic acid compound, which is a deterioration product of oxidized resin component, is 5 ppb or less. The content of each of metallic impurities, namely, Ca, K, Fe, and Cr is preferably controlled to 5 ppb or less. The particles attached to the resin are nearly completely removed by means of the cleaning method of the invention.

The second aspect of the invention involves a plastic substrate made of thermoplastic norbornene resin for use in a magnetic recording medium.

A plastic substrate for a magnetic recording medium in the invention uses a thermoplastic norbornene resin that is purified by the above-described purification method of the first aspect of the invention.

The plastic substrate of the invention is formed by the injection-molding technique that is known by the skilled person. The injection-molding may be conducted, for example, by using a commercially available injection-molding apparatus equipped with a mold having a stamper, by employing appropriate resin temperature, injection speed and mold clamping pressure, and by setting mold temperatures of fixed side and moving side at appropriate values. The specific examples of the parameters of injection-molding may be resin temperature of 350° C., injection speed of 170 mm/s, and mold clamping pressure of 70 kg/cm². The mold temperatures of fixed side and moving side are 130° C. and 130° C., for example. These conditions of injection-molding allows to form a substrate having diameter of 95 mm and thickness of 1.27 mm.

A substrate for a magnetic recording medium of the invention has protruding or concave defects with diameter of 1 μm or more, preferably, in the number of not more than 100 per surface.

The third aspect of the invention involves a magnetic recording medium using the plastic substrate of the invention.

A magnetic recording medium of the invention uses a substrate manufactured by injection-molding the thermoplastic norbornene resin that is purified by the above-described purification method.

Referring to FIG. 1, a substrate 1 of the magnetic recording medium of the present invention is a plastic substrate manufactured by injection-molding thermoplastic norbornene resin that is purified by the method of the first aspect of the present invention. Intermediate layer 2, non-magnetic under-layer 3, magnetic layer 4, protective layer 5 and liquid lubricant layer 6 are sequentially formed on substrate 1 to produce a magnetic recording medium. Conventionally used materials may be used for materials for intermediate layer 2, non-magnetic under-layer 3, magnetic layer 4, protective layer 5 and liquid lubricant layer 6. For example, intermediate layer 2 is a metal layer of Ni—Al, non-magnetic under-layer 3 is made of chromium, magnetic layer 4 is made of an cobalt alloy, such as a ferromagnetic alloy of Co—Cr—Pt or Co—Cr—Ta, protective layer 5 is a carbon layer, and liquid lubricant layer 6 is made of a fluorine-containing lubricant, such as perfluoropolyether lubricant.

Though magnetic recording medium of the invention has been described referring to FIG. 1, the structure of FIG. 1 is only an example and various modifications are possible. For example, intermediate layer 2 may not be provided in a magnetic recording medium of the invention.

A shape of a magnetic recording medium of the invention may be selected corresponding to the apparatus that the medium is to be mounted, and is not limited to any specific form. For example, a shape of a disk may be selected for a magnetic recording medium mounted on a HDD.

A magnetic recording medium of the invention can completely avoid blistering even when the medium has been left under a hot and humid environment or a cold and dry environment. A magnetic recording medium of the invention preferably does not have any blister on the surface thereof. Most preferably there is not a blister that has a diameter of 1 μm or more and a height of 0.1 μm or more on a surface of the medium.

The fourth aspect of the invention involves a method for manufacturing a magnetic recording medium. The method comprises steps of purifying thermoplastic norbornene resin, forming a plastic substrate by injection-molding the purified thermoplastic norbornene resin, and depositing functional layers on the substrate, in which magnetic layer, protective layer and liquid lubricant layer are sequentially formed. The step of purifying the resin in the method for manufacturing a magnetic recording medium in the invention comprises a process for cleaning the thermoplastic norbornene resin in cleaning liquid selected from 2-propanol and mixed solvent of 2-propanol and water.

The step for purifying thermoplastic norbornene resin has been described in the description of the first aspect of the invention. The step for forming the plastic substrate by injection-molding has been described in the description of the second aspect of the invention.

The step for depositing layers for recording function on the plastic substrate comprises processes of forming intermediate layer 2 on substrate 1 by sputtering, coating intermediate layer 2 with non-magnetic under-layer 3, forming magnetic layer 4 on under-layer 3, forming protective layer 5 on magnetic layer 4, and applying lubricant diluted with a solvent on protective layer 5. Non-magnetic under-layer 3 is preferably a chromium layer, and magnetic layer 4 is preferably an alloy layer of Co-14Cr-4Ta. Protective layer 5 may be a carbon protective layer, major component of which may be either usual graphite or diamond-like carbon. Liquid lubricant layer 6 may be made of a fluorine-containing lubricant, such as perfluoropolyether lubricant.

Non-magnetic under-layer 3, magnetic layer 4, and protective layer 5 may be formed by sputtering when these layers are a chromium non-magnetic under-layer, Co-14Cr-4Ta magnetic alloy layer, and a carbon protective layer, respectively. Liquid lubricant layer 6 may be formed by dip-coating or spin-coating.

Thicknesses of intermediate layer 2, non-magnetic under-layer 3, magnetic layer 4, protective layer 5, and liquid lubricant layer 6 may be selected to be the values that are employed in a common magnetic recording medium.

The above-described construction of a magnetic recording medium shall not limit the present invention; the intermediate layer, for example, may not be provided in the recording medium of the invention.

EXAMPLES

The present invention will be described in further detail referring to examples of preferred embodiments thereof.

Method for cleaning pellets of thermoplastic norbornene resin was studied with various cleaning liquid and cleaning time, as shown in Table 4.

TABLE 4

| | Methods for cleaning resin pellets | | | |
|---|---|---|---|---|
| | cleaning liquid | oscillation time (hr) | immersion time (hr) | rinse method |
| no cleaning process | — | — | — | — |
| cleaning method 1 | water | 2 | 12 | ultrapure water 4 times |
| cleaning method 2 | IPA:water = 1:1 | 2 | 2 | IPA:water = 1:1, twice & water, twice |
| cleaning method 3 | IPA:water = 1:1 | 2 | 12 | IPA:water = 1:1, twice & water, twice |
| cleaning method 4 | IPA:water = 2:1 | 2 | 2 | IPA:water = 2:1, twice & water, twice |
| cleaning method 5 | IPA:water = 2:1 | 2 | 12 | IPA:water = 2:1, twice & water, twice |
| cleaning method 6 | IPA | 2 | 12 | IPA, twice & water, twice |

Example 1

Two kilogram(kg) of thermoplastic norbornene resin, ZEONEX280R manufactured by Nippon Zeon Co., Ltd., was soaked in 4 liter of ultrapure water, that is a cleaning liquid, in a separating funnel, and purified according to cleaning method 1. Specifically, the separating funnel containing the resin and the ultrapure water was mounted on a shaker manufactured by Nippon Scientific Equipment Manufacturing Co., Ltd. and shaken at a shaking speed of 200 mm/s for 2 hr, then left stationary for 12 hr.

After that, the cleaning liquid was drawn off, and 4 liter of ultrapure water was replenished. The separating funnel was subjected to shaking for 2 to 3 min and brought to stationary, and then the ultrapure water was drawn off. This operation for rinsing the pellets was repeated four times in total, and further rinsing with running water was conducted for more than 5 min. The remaining liquid was completely eliminated by drying at 100° C. for 24 hr and drying in a vacuum at 100° C. for 8 hr. A part of the purified pellets was used for measuring impurity concentration as described later.

Another part of the purified pellets of the resin was used for fabricating a substrate for a magnetic recording medium having diameter of 95 mm and thickness of 1.27 mm by means of injection-molding. A commercially available injection-molding machine with maximum injection-molding pressure of 70 ton was used employing a mold fixed with a stamper. The parameters in the injection-molding were; resin temperature: 350° C., injection velocity: 170 mm/s, mold clamping pressure: 70 kg/cm$^2$, and mold temperature at fixed side and moving side: 130° C. and 130° C.

Example 2

On the substrate fabricated by Example 1, sequentially formed by DC sputtering are a chromium under-layer 500 Å thick, a Co-14Cr-4Ta magnetic layer 300 Å thick, and a carbon protective layer 80 Å thick, followed by tape varnishing on the sputtered surface. Then, a liquid lubricant layer 20 Å thick was formed by spin-coating a fluorine-containing lubricant, FOMBLIN Z-DOL manufactured by Ausimont, S.p.A. Thus, a magnetic recording medium was obtained.

Example 3

Pellets of thermoplastic norbornene resin, ZEONEX280R manufactured by Nippon Zeon Co., Ltd. and the cleaning liquid shown in Table 4, at the row for cleaning method 2 were put into a separating funnel, in which the volume ratio of the resin to the cleaning liquid was 1 to 2. The purification was performed according to cleaning method 2. Specifically, the separating funnel containing the resin and the cleaning liquid was mounted on a shaker manufactured by Nippon Scientific Equipment Manufacturing Co., Ltd. and shaken at a shaking speed of 200 mm/s for 2 hr, then left stationary for 2 hr.

After that, the cleaning liquid was drawn off, and a liquid with the same composition as the cleaning liquid was replenished. The separating funnel was subjected to shaking for 2 to 3 min and brought to stationary, and then the liquid was drawn off. This operation for rinsing the pellets was repeated two times in total. Then, the pellets were rinsed twice using ultrapure water with resistivity of 18 MΩ-cm or more in the same manner as the rinsing using the cleaning liquid described just above. Further, rinsing with running water was conducted for more than 5 min. The remaining liquid was completely eliminated by drying at 100° C. for 24 hr and drying in a vacuum at 100° C. for 8 hr. A part of the purified pellets was used for measuring impurity concentration as describe later.

Another part of the purified pellets of the resin was used for fabricating a substrate for a magnetic recording medium having diameter of 95 mm and thickness of 1.27 mm by means of injection-molding. A commercially available injection-molding machine with maximum injection-molding pressure of 70 ton was used employing a mold fixed with a stamper. The parameters in the injection-molding were; resin temperature: 350° C., injection velocity: 170 mm/s, mold clamping pressure: 70 kg/cm$^2$, and mold temperature at fixed side and moving side: 130° C. and 130° C.

Example 4

A step for depositing functional layers was conducted on the substrate fabricated in Example 3 in the same manner as in Example 2, to produce a magnetic recording medium of Example 4.

Example 5

Pellets of thermoplastic norbornene resin were purified in the same manner as in Example 3 except that the cleaning method 3 in Table 4 was employed in Example 5 in place of cleaning method 2 in Example 3. A substrate for a magnetic recording medium was fabricated using the thus purified pellets of the resin.

Example 6

A step for depositing functional layers was conducted on the substrate fabricated in Example 5 in the same manner as in Example 2, to produce a magnetic recording medium of Example 6.

Example 7

Pellets of thermoplastic norbornene resin were purified in the same manner as in Example 3 except that the cleaning method 4 in Table 4 was employed in Example 7 in place of cleaning method 2 in Example 3. A substrate for a magnetic recording medium was fabricated using the thus purified pellets of the resin.

Example 8

A step for depositing functional layers was conducted on the substrate fabricated in Example 7 in the same manner as in Example 2, to produce a magnetic recording medium of Example 8.

Example 9

Pellets of thermoplastic norbornene resin were purified in the same manner as in Example 3 except that the cleaning method 5 in Table 4 was employed in Example 9 in place of cleaning method 2 in Example 3. A substrate for a magnetic recording medium was fabricated using the thus purified pellets of the resin.

Example 10

A step for depositing functional layers was conducted on the substrate fabricated in Example 9 in the same manner as in Example 2, to produce a magnetic recording medium of Example 10.

Example 11

Pellets of thermoplastic norbornene resin were purified in the same manner as in Example 3 except that the cleaning method 6 in Table 4 was employed in Example 11 in place of cleaning method 2 in Example 3. A substrate for a magnetic recording medium was fabricated using the thus purified pellets of the resin.

Example 12

A step for depositing functional layers was conducted on the substrate fabricated in Example 11 in the same manner as in Example 2, to produce a magnetic recording medium of Example 12.

Comparative Example 1

A substrate for a magnetic recording medium was fabricated using pellets of thermoplastic norbornene resin that did not experienced any cleaning process. Fabrication method was the same as in Example 1 except that any cleaning or rinsing process in Example 1 was not carried out in Comparative Example 1.

Comparative Example 2

A step for depositing functional layers was conducted on the substrate fabricated in Comparative Example 1 in the same manner as in Example 2, to produce a magnetic recording medium of Comparative Example 2.

Evaluation of Examples and Comparative Examples

Impurity content of each of the resin pellets of Examples 1, 3, 5, 7, 9, 11 and Comparative Example 1 was measured. The number of surface defects on each of the substrates fabricated in these Examples and Comparative Example was also measured.

Method for measuring the impurity content was the same as the method employed to obtain impurity content of Tables 1 through 3 and is described on the appropriate place of the Specification. Measurement of the number of surface defects was performed by observation under optical microscope, and the number of the defects not less than 1 μm was counted.

Measured impurity contents of the resin pellets are given in Tables 5a, 5b, and 5c. The numbers of defects on the surface of the substrate fabricated by injection-molding the resin are given in Table 6.

TABLE 5a

Ionic Impurities (ppb)

| | Ionic Impurity | | | | | |
|---|---|---|---|---|---|---|
| | Na | SO$_4$ | NO$_3$ | K | Cl | HCOO |
| Comp. Ex. 1 | 150 | 40 | 20 | 15 | 10 | 15 |
| Example 1 | 140 | 35 | 18 | 10 | 8 | 10 |
| Example 3 | 20 | 8.8 | 5.1 | 2.3 | 0.8 | <0.1 |
| Example 5 | 5.0 | 4.1 | 3.0 | 0.5 | <0.1 | <0.1 |
| Example 7 | 4.8 | 4.3 | 4.1 | 0.8 | <0.1 | <0.1 |
| Example 9 | 2.1 | 2.0 | 1.1 | <0.1 | <0.1 | <0.1 |
| Example 11 | 4.2 | 4.5 | 3.5 | 0.8 | <0.1 | <0.1 |

TABLE 5b

Organic Impurities (ppb)

| | Organic Impurity | | | |
|---|---|---|---|---|
| | hydrocarbon | deteriorated oxidized resin | deteriorated antioxidant | siloxan |
| Comp. Ex. 1 | 150 | 60 | 20 | 38 |
| Example 1 | 130 | 60 | 19 | 36 |
| Example 3 | 60 | 15 | 8 | 2.0 |
| Example 5 | 20 | 5 | 5 | 0.5 |
| Example 7 | 8 | 2.5 | 2.5 | <0.1 |
| Example 9 | 7 | 2.5 | 1.0 | <0.1 |
| Example 11 | 7 | 2.0 | 1.0 | <0.1 |

TABLE 5c

Metallic Impurities (ppb)

| | Metallic Impurity | | | |
|---|---|---|---|---|
| | Ca | K | Fe | Cr |
| Comp. Ex. 1 | 100 | 40 | 60 | 10 |
| Example 1 | 72 | 28 | 55 | 5.0 |
| Example 3 | 10.3 | 5.8 | 8.7 | 0.8 |
| Example 5 | 4.6 | 3.8 | 3.0 | <0.1 |
| Example 7 | 3.7 | 2.2 | 2.8 | <0.1 |
| Example 9 | 2.2 | 0.3 | <0.1 | <0.1 |
| Example 11 | 11.3 | 5.9 | 6.3 | 1.3 |

TABLE 6

Number of surface defects on the substrate

| | number of defects per surface |
|---|---|
| Comp. Example 1 | 380 |
| Example 1 | 360 |
| Example 3 | 150 |
| Example 5 | 80 |
| Example 7 | 50 |
| Example 9 | 30 |
| Example 11 | 70 |

It is clearly understood that the number of surface defects of the substrate made of the resin pellets is smaller when the purity of the resin pellets is higher.

The measured results for Examples 5, 7, 9, and 11 show that the number of surface defects is less than 100 when the resin pellets are immersed in the mixed solvent of IPA: water=1:1 for 12 hr (Example 5), in the mixed solvent of IPA: water=2:1 for 2 hr (Examples 7 and 9), or in IPA for 12 hr (Example 11).

In contrast, the cleaning using ultrapure water alone as in Example 1 showed very little effect because the surface of the pellet of thermoplastic norbornene resin is hydrophobic or repels water, so that the water does not penetrate into the pellet.

Use of IPA or mixed solvent of IPA and water according to the purifying method of the invention increases wettability with the surface of the resin pellet, and facilitates penetration of the cleaning liquid into the resin. In addition, oscillation and immersion over certain duration in this cleaning liquid further promote the penetration and result more effective removal of the impurities. The major defects classified in three categories as described earlier may be formed from the organic impurity core in the resin pellet, which is a deterioration product of an oxidized resin component that is alcohol or carboxylic acid, or a deterioration product of antioxidant that is deteriorated phenol derivative. Consequently, effective impurity removal is facilitated by using the cleaning liquid in the invention.

Example 11, which uses the cleaning liquid of 100% IPA, shows relatively poor effect to remove metallic and ionic impurities as compared with the Examples using the mixed solvent of IPA and water although Example 11 exhibits significant effect to remove the organic impurities, as shown in Table 5. As a result, the number of defects on the substrate surface in Example 11 was slightly larger than in the Examples using the mixed solvent of IPA and water, while Example 11 also satisfies the criterion of the invention that the number of defects be 100 or less.

Further, an environmental reliability test was conducted on each of the magnetic recording media produced in Examples 2, 4, 6, 8, 10, 12 and Comparative Example 2. In the test, a specimen of the medium was stored under 60° C., 80% RH for 4 hr, brought back to 25° C., 10% RH, stored under −40° C., 10% RH for 4 hr, and returned to 25° C., 10% RH. After the thermal cycle, the surface of the medium was observed under the optical microscope, and the number of the blister that was not smaller than 1 μm in diameter and not lower than 0.1 μm in height was counted. The result is given in Table 7.

TABLE 7

Number of blisters after environmental reliability test

| | number of blisters per surface |
|---|---|
| Comp. Example 2 | 500 |
| Example 2 | 400 |
| Example 4 | 50 |
| Example 6 | 0 |
| Example 8 | 0 |
| Example 10 | 0 |
| Example 12 | 20 |

As is apparent from Table 7, no blister was observed on the magnetic recording medium of Examples 6, 8, and 10. This fact demonstrates that the cleaning conditions in Examples 5, 7, and 9 bring about excellent effect. That is, the favorable conditions are: oscillation in the cleaning liquid for 2 hr, and then immersion in mixed solvent of IPA:water=1:1 for 12 hr or more, or in a mixed solvent of IPA:water=2:1 for 2 hr or more. In Example 12, in which cleaning was done using IPA alone, elimination effects for metallic and ionic impurities are slightly less than cleaning using mixed solvent of IPA and water. As a result, a little number of blisters was observed.

The occurrence of blistering on the medium in the above-described test is caused by interaction between moisture absorbed in the substrate and hydrophilic impurities, such as alcohol or carboxylic acid compound, or ionic or metallic impurities, existing on the interface between the substrate and the magnetic layer, and subsequent diffusion up to the medium surface. However, a magnetic recording medium of the invention uses a plastic substrate made of specially purified thermoplastic norbornene resin, so that the impurities existing on the substrate surface is very little. Consequently, the blistering on the medium can be completely suppressed. Thus, a magnetic recording medium of the invention is excellent in environmental reliability.

Effect of the Invention

The impurities that may be contained in the thermoplastic norbornene resin are hydrophilic organic impurities that are deterioration product of oxidized resin, such as alcohol or carboxylic acid, deterioration product of antioxidant of phenol derivatives, hydrocarbon impurities, ionic impurities, and metallic impurities. The method for purifying the resin according to the invention controls each of the impurities below a certain value.

A substrate for a magnetic recording medium according to the invention is fabricated by injection-molding thermoplastic norbornene resin purified by the purification method of the invention, and has a surface that bears very little number of protruding or concave defects, and exhibits high precision.

A magnetic recording medium according to the invention does not generate blistering in the environmental reliability test subjected to a thermal cycle between hot and humid condition and cold and dry condition, as well as in normal temperature and humidity environment. Accordingly, the medium exhibits high precision and reliability.

A method for manufacturing a magnetic recording medium according to the invention allows to produce highly precise and reliable media bearing little surface defects in a mass production and with low cost. Hence, the manufacturing method is of great value in industry.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. A method for purifying a thermoplastic norbornene resin comprising the steps of:

cleaning said norbornene resin to eliminate organic impurities, ionic impurities, metallic impurities, and particles by using cleaning liquid selected from 2-propanol and a mixed solvent of 2-propanol and water to form a purified resin; and after the cleaning step, forming a plastic substrate by injection-molding said purified resin.

2. The method for purifying a thermoplastic norbornene resin according to claim 1, wherein said mixed solvent has a mixing ratio of 2-propanol to water of from 1:1 to 5:1 by volume.

3. The method for purifying a thermoplastic norbornene resin according to claim 1, wherein said purified resin contains said organic impurities not more than 30 ppb, said ionic impurities not more than 5 ppb, and said metallic impurities not more than 5 ppb.

4. The method for purifying a thermoplastic norbornene resin according to claim 2, wherein said purified resin contains said organic impurities not more than 30 ppb, said ionic impurities not more than 5 ppb, and said metallic impurities not more than 5 ppb.

5. The method for purifying a thermoplastic norbornene resin according to claim 3, wherein said organic impurities comprise hydrocarbon impurities of not more than 20 ppb, deterioration product of antioxidant of not more than 5 ppb, and deterioration product of oxidized resin component of not more than 5 ppb.

6. The method for purifying a thermoplastic norbornene resin according to claim 4, wherein said organic impurities comprise hydrocarbon impurities of not more than 20 ppb, deterioration product of antioxidant of not more than 5 ppb, and deterioration product of oxidized resin component of not more than 5 ppb.

7. A method for manufacturing a magnetic recording medium comprising the steps of:

purifying a thermoplastic norbornene resin using a cleaning liquid that is selected from 2-propanol and a mixed solvent of 2-propanol and water;

after the purifying step, forming a plastic substrate by injection-molding said purified resin; and sequentially depositing a magnetic layer, a protective layer, and a liquid lubricant layer on said plastic substrate.

8. The method for manufacturing a magnetic recording medium according to claim 7, wherein said mixed solvent of 2-propanol and water is a mixture with mixing ratio 2-propanol: water is from 1:1 to 5:1.

* * * * *